Patented July 4, 1944

2,352,791

UNITED STATES PATENT OFFICE 2,352,791

MAGNETIC FIELD CONTROL OF HETEROGENEOUS CATALYSTS

Orus F. Krumboltz, Huron, S. Dak.

Drawing. Application August 7, 1940,
Serial No. 351,779

10 Claims. (Cl. 204—155)

The present application is a continuation-in-part of my copending application Serial No. 132,727, filed March 24, 1937.

The present invention relates broadly to a method of controlling the rate of catalytic reaction, and more particularly to a method of controlling the activity of heterogeneous catalysts.

The preparation of heterogeneous catalysts, commonly known as contact masses or agents, is well known to require the most painstaking care, both with regard to the purity of the starting materials and the details of the process of working up these materials. Despite the great care employed in the preparation of these masses, the activity of the agent can be determined in many instances only by actual trial; in other words, the mass must be standardized before it is employed. Despite the great activity in this particular art in attempting to devise reliable methods of preparing standardized contact masses, no one has thus far succeeded in devising a generally satisfactory method of controlling the activity of the finished contact mass.

The object of the present invention is a simple and effective method of controlling the activity of heterogeneous catalysts.

A further object is a method of carrying out chemical catalytic reactions whereby the rate of the reaction may be regulated within certain limits.

Another object is a method of activating contact masses by a process which is simple, flexible, and convenient to apply either in the laboratory or on a commercial scale.

An additional object is a simple and effective method of reactivating exhausted, overheated, poisoned, or otherwise deactivated contact masses.

A still further object is a method of modifying the conditions necessary to bring about a chemical reaction by means of a heterogeneous catalyst of controlled activity.

Other objects will appear as the invention is hereinafter more fully described.

In order to understand the nature of the present invention whereby the foregoing objects may be accomplished, it is desirable to present a brief explanation of the working hypothesis upon which the invention is based. Briefly described, the working hypothesis behind the present invention is that the activity of a heterogeneous catalyst is dependent to a considerable extent upon the magnetic properties thereof. In other words, catalytic and magnetic phenomena appear to be closely interrelated. This general observation is supported by a great mass of facts. Thus, for example, a large majority of the strongly active heterogeneous catalysts are paramagnetic or ferromagnetic. Furthermore, in certain reactions it is known that strongly magnetic catalysts such as iron, cobalt, nickel, and the like bring about too violent a reaction to be useful, whereas weakly magnetic catalysts bring about a milder and more practicable reaction rate. Again, catalytic and magnetic phenomena are both closely related to crystal structure. Likewise, the activity of hydrogenation catalysts such as platinum, nickel, and iron is related to the solubility of hydrogen therein, and this in turn is related to the magnetic properties of the metal, since hydrogen is soluble in the paramagnetic and ferromagnetic metals but insoluble in the diamagnetic metals such as zinc, bismuth, lead, cadmium, thalium, tin, antimony, silver, and gold.

A still further example of the correlation is found in the fact that the maximum or ceiling temperatures at which strongly catalytic materials may be used roughly corresponds, in general, to the maximum temperature for the magnetic properties; thus ferromagnetic materials such as iron and cobalt have high magnetic critical temperatures and correspondingly high catalytic critical temperatures. On the other hand, nickel in many cases has a relatively low critical temperature with respect to both catalytic and magnetic properties.

Many other examples could be cited, but one of the most striking illustrations of this correlation is the fact that both the catalytic and the magnetic properties of various materials are greatly affected by poisons.

From the foregoing it is seen that the activity of contact agents appears in many cases to be correlated with the magnetic properties of the material. It is evident, however, that the relationship is not simple, for in many cases a strongly ferromagnetic material may actually prove to be an inferior catalyst for a given reaction than a weakly paramagnetic material. Such facts do not necessarily contradict the working hypothesis behind the present invention but merely indicate that chemical and physical factors are also of great importance and in individual cases may totally obscure the magnetic effect.

The present invention is based on a practical application of the foregoing working hypothesis. Briefly stated, the invention embraces a process or method of controlling the activity of heterogeneous catalysts, which comprises maintaining said catalysts in a magnetic field proportioned in respect to density, polarity and intensity so as to achieve the desired catalytic activity. In other words, the activity of a specific catalyst, after it has been prepared, may be either augmented or decreased in accordance with my invention, by varying the resultant magnetic environment in which the catalyst is employed. In general, the magnetic density of the field or environment as measured in gauss appears to be the controlling factor. However, it is to be understood that the polarity and intensity of the field may also be adjusted to suit the individual case.

As a result of an extended investigation I have found that the strength of the effective magnetic field on the catalyst determines whether the effect will be an enhancement or a retardation of the catalytic activity. Indeed, the surprising discovery was made that in general, field strengths of about 10 gauss or more produce retardation, whereas field strengths somewhere in the range between about 0 and about 10, generally between 2 and 5, produce an enhancement of the catalytic activity. The maximum field strength at which a noticeable enhancement of catalytic activity is attained was found in general to vary within a relatively narrow range, depending on the catalysts, the reaction conditions and the like. However, it seems evident that the critical field strength at which the effect changes from acceleration to retardation is somewhere between about 5 and 10 gauss. In other words, in the region between about 5 and 10 gauss the magnetic influence changes from positive to negative. Thus, from about 2 to about 5 gauss the effect is generally positive; from about 5 or 6 to perhaps 10, the effect approaches zero and may become negative, and above about 10 the effect is consistently negative. Accordingly, where it is desired to effect an enhancement of the catalytic activity, the magnetic environment should be adjusted to a field strength below about 10, and generally from about 2 to about 5 gauss. On the other hand, where it is desired to effect a retardation of the catalytic activity, the magnetic environment is adjusted to a field strength above about 5, and preferably above about 10. Those skilled in the art will of course be able to determine the precise critical field strength where the effect changes from positive to negative, for any particular reaction when carried out under any particular conditions and with specific reactants and catalyst. To determine this for a specific reaction, it is only necessary gradually to increase the field strength while noting the effect on the rate of reaction. In general, however, it will be found that the critical range where the effect changes from positive to negative is between about 5 and about 10 gauss.

This discovery affords a simple and effective method of controlling catalytic reactions. Thus, for example, in instances where it is difficult to initiate a catalytic reaction, a field strength of, say, 2 to 5 gauss may be applied to the catalyst. After the reaction has started, the field may be removed, if desired, or if the reaction proceeds too slowly after initiation without the magnetic effect, the field may be continued in the range mentioned. If the reaction tends to become too violent, the field strength may be reduced to zero or a retarding influence may be brought to bear on the reaction by applying a field strength above about 5 to 10, say, 10 for example. Thus by adjusting the effective field strength on the catalyst it is possible constantly to exert a regulating influence on the rate of the reaction.

In practice, the invention may be carried out quite simply and effectively in a number of alternative ways. Thus the catalyst itself, or the catalyst chamber, may be surrounded by a simple magnetic coil or electromagnet, so that the earth's magnetic field is either neutralized or altered to provide the proper field strength for the reaction. It may also be carried out merely by placing a permanent magnet or electrical coil, provided with an iron core, near the catalyst, or by surrounding the catalyst with a ferromagnetic or paramagnetic material, and adjusting the conditions so that the proper field strength for the desired effect is produced.

Other variations and combinations of the foregoing methods will be readily apparent to any one skilled in the art and are included within the scope of the invention.

In order to disclose the nature of my invention more clearly, several specific embodiments thereof will now be described. It is to be understood, however, that this is done solely by way of illustration and is not to be regarded as a limitation upon the spirit or scope thereof.

EXAMPLE I

*Hydrogenation of vegetable oil*

A small amount of commercial cottonseed oil was placed in a glass tube provided with a mechanically driven glass stirrer and means for passing hydrogen through the oil contained in the tube, a small amount of asbestos upon which nickel had been precipitated being employed as a catalyst. The tube was so arranged that hydrogen could be bubbled through the oil therein, and means were provided for heating the contents of the tube to a temperature of from 75° to 150° C. The tube was lowered into a core made of a non-conducting material such as cardboard, about which 500 turns of insulating wire had been wound. Under the conditions above described, it was found that substantially no hydrogenation took place when a current was not applied to the coil, whereas, on the other hand, hydrogenation occurred when a direct current was passed through the coil creating a field strength of about 3 gauss. The optimum field strength appeared to be in the neighborhood of 3 gauss, with decreasing effects for the higher strengths up to 9–10 gauss, where the magnetic effect approached zero. In any event, hydrogenation would not proceed at the stated temperatures in the absence of the magnetic field. The hydrogenation of cottonseed oil was thus successfully effected at a temperature between 75° and 150° C., at atmospheric pressure, by use of a nickel catalyst in the presence of a magnetic field.

EXAMPLE II

*Oxidation of toluene to benzaldehyde*

Air was bubbled through toluene, and the vapors were then passed through a glass tube in which there was placed a small amount of iron oxide which had been precipitated upon asbestos and dried at 200° to 300° C. This mass of iron oxide catalyst was held in place by two plugs of glass wool, and a very small flame was used to heat it to a temperature of about 150° C. Immediately above the locus of the catalyst was placed an electromagnet capable of creating a field strength of 3–7 gauss, and provided with a means for turning the current on and off. When passing the toluene-laden air over the catalyst, with current applied to the electromagnet, the catalyst soon became incandescent. When the current from the electromagnet was cut off, this incandescence died out, but it could be restored by passing the current through the magnet so as to re-establish the magnetic field. This could be done a number of times. In the effluent gases from the apparatus the odor of benzaldehyde, formed as a result of the oxidation of the toluene, was plainly evident. When the field strength was increased to above about 7 gauss, retardation of the catalytic activity was observed.

EXAMPLE III

*Catalytic decomposition of hydrogen peroxide*

A solution of hydrogen peroxide was placed in a vessel provided with a means for determining the quantity of gas evolved therein. In the bottom of the vessel a lump of manganese dioxide was located within a magnetic field created by surrounding the vessel at the locus of the catalyst with an electromagnet capable of producing a field strength of about two gauss. Substantially no gas evolved until the electromagnet was energized, thereby creating a magnetic field about the catalyst. When the coil was energized, a steady evolution of gas took place. When the coil was disconnected from the current, the rate of evolution substantially decreased. Likewise, when the field strength was increased to above about 5 gauss the rate of reaction was decreased. The greatest enhancement in the catalytic activity appeared to take place when the field strength was in the neighborhood of 2 gauss.

EXAMPLE IV

The same experiment as described in Example III was carried out, using finely divided manganese dioxide as a catalyst in place of the lump of manganese dioxide employed in the previous experiment. Under these conditions the application of the two-gauss field produced a less pronounced increase in the rate of gas evolution. It is therefore evident that the magnetic effect is most significant when the catalyst under observation is not pre-activated. In other words, the activity of manganese dioxide in the lump form is greatly increased by the two-gauss magnetic field, whereas the activity of finely divided pre-activated manganese dioxide is not affected to the same degree.

The above example indicates that catalytic reactions which normally proceed relatively rapidly are less significantly influenced by the application of a low strength magnetic field. Thus the greatest application of the invention probably resides in the field of starting reactions which are slow to start, or in starting a reaction under proper conditions so that a certain product can be produced, or in overcoming the effect of poisons or the effect of improper methods of preparing the catalyst. However, in many cases the course of the reaction can be altered by the application of a field of appropriate strength even after the reaction has been started and is proceeding rapidly.

EXAMPLE V

*Elementary synthesis of water*

The reaction between hydrogen and oxygen was carried out in the presence of a platinum catalyst. When the earth's magnetic field was neutralized by surrounding the catalyst with an electromagnet the reaction substantially ceased. When the polarity of the coil was reversed, thereby augmenting the earth's magnetic field, the reaction rate was greatly increased provided the field strength was below about 5 gauss. When the coil was removed, the rate of reaction was approximately intermediate the two extremes. The reaction substantially ceased when the earth's magnetic field was cut out by surrounding the catalyst with an iron shield.

The foregoing examples illustrate the wide applicability of the present invention. The types of heterogeneous catalytic reactions which may be influenced by a magnetic field proportioned to achieve the desired activity are numerous and industrially highly important. Among the various applications contemplated by the present invention, the following may be mentioned by way of example:

(1) Catalytic reductions including the reduction of carbon monoxide; carbon dioxide, aldehydes, ketones, esters, and carboxylic acids to the corresponding alcohols by means of hydrogen in the presence of suitable catalysts; the hydrogenation of olefins, terpenes, acetylenes and aromatic hydrocarbons to the corresponding saturated hydrocarbons; and the reduction of nitriles, nitro compounds, azo and azoxy compounds to the corresponding amines.

(2) Catalytic polymerization-condensations, such as the formation of benzene from acetylene.

(3) Catalytic dehydrogenations, such as the formation of aldehydes and ketones from primary and secondary alcohols.

(4) Catalytic dehydrations, such as the formation of olefins from the corresponding alcohols and the catalytic esterification of alcohols with volatile carboxylic acids.

(5) Catalytic oxidations, such as the oxidation of hydrocarbons, alcohols, aldehydes, ketones and the like to the corresponding aldehydes, ketones or carboxylic acids; the oxidation of alkyl substitutes of the aromatic nucleus—for example, the formation of benzaldehyde or benzoic acid from toluene; the oxidation of aromatic hydrocarbons involving the rupture of the nucleus, as in the formation of maleic acid or its anhydride from benzene, or phthalic anhydride from naphthalene; and the oxidation of ammonia to oxides of nitrogen.

(6) Catalytic, pyrolytic decompositions, such as the catalytic cracking of petroleum hydrocarbons.

In the foregoing detailed description of my invention it is apparent that many variations and additions thereto may be made without departing from the spirit and scope thereof; thus many specific applications of my invention may be made by any one skilled in the art. I therefore intend to be limited only in accordance with the following patent claims.

I claim:

1. In the catalytic hydrogenation of unsaturated materials the process of controlling the activity of the heterogeneous catalyst, which comprises applying to said catalyst a magnetic field having an effective strength below about 5 gauss and proportioned to modify the effective magnetic field of the earth and to achieve a predetermined enhancement of the activity of said catalyst.

2. The process of hydrogenating unsaturated materials, which comprises hydrogenating said material in the presence of a heterogeneous catalyst while applying to said catalyst a magnetic field having a strength below about 5 gauss and proportioned to modify the effective magnetic field of the earth and to effect a predetermined enhancement of the activity of said catalyst.

3. The process of claim 2, wherein said unsaturated material consists of an unsaturated oil.

4. The process of claim 2, wherein said unsaturated material consists of a glyceryl ester of an unsaturated acid.

5. The process of carrying out an oxidation reaction, which comprises treating an oxidizable material with an oxidizing agent in the presence of an oxidation-promoting heterogeneous catalyst while maintaining said catalyst in a magnetic field having a strength below about 5 gauss and proportioned to modify the effective magnetic field of the earth and to effect a predetermined enhancement of the activity of said catalyst.

6. The process of oxidizing a hydrocarbon, which comprises treating said hydrocarbon with an oxidizing agent in the presence of an oxidation-promoting heterogeneous catalyst while maintaining said catalyst in a magnetic field having a strength below about 5 gauss and proportioned to modify the effective magnetic field of the earth and to effect a predetermined enhancement of the activity of said catalyst.

7. The process of claim 6, wherein said hydrocarbon consists of an aromatic hydrocarbon containing an alkyl substituent.

8. The process of controlling the activity of a heterogeneous catalyst, which comprises applying to said catalyst an uninterrupted, substantially constant, uniform magnetic field proportioned to modify the effective magnetic field of the earth and to effect a predetermined alteration of the activity of said catalyst, said field having a strength above about 5 to 10 gauss where a retarding effect is desired, and a strength below about 5 gauss where an accelerating effect is desired.

9. The process of controlling the activity of a heterogeneous catalyst, which comprises applying to said catalyst an uninterrupted, substantially constant, uniform magnetic field having a strength below about 5 gauss and proportioned to modify the effective magnetic field of the earth and to effect a predetermined enhancement of the activity of said catalyst.

10. The process of controlling the activity of a heterogeneous catalyst, which comprises applying to said catalyst an uninterrupted, substantially constant, uniform magnetic field having a strength from about 5 gauss to about 10 gauss and proportioned to modify the effective magnetic field of the earth and to effect a predetermined retardation of the activity of said catalyst.

ORUS F. KRUMBOLTZ.